US007881675B1

(12) United States Patent
Gazdzinski (10) Patent No.: US 7,881,675 B1
(45) Date of Patent: Feb. 1, 2011

(54) WIRELESS CONNECTOR AND METHODS

(76) Inventor: Robert F. Gazdzinski, 11027 Elderwood La., San Diego, CA (US) 92131

( * ) Notice: Subject to any disclaimer, the term of this patent is extended or adjusted under 35 U.S.C. 154(b) by 647 days.

(21) Appl. No.: 11/328,359

(22) Filed: Jan. 9, 2006

Related U.S. Application Data

(60) Provisional application No. 60/642,349, filed on Jan. 7, 2005.

(51) Int. Cl.
*H04B 1/40* (2006.01)
(52) U.S. Cl. ............... 455/74.1; 455/80; 455/338; 455/346; 439/676; 439/344; 439/941
(58) Field of Classification Search ............ 455/74.1, 455/80, 338, 346, 347; 370/466, 392; 439/676, 439/344, 941, 620, 701
See application file for complete search history.

(56) References Cited

U.S. PATENT DOCUMENTS

| | | | |
|---|---|---|---|
| 4,972,480 A | 11/1990 | Rosen | |
| 5,069,641 A | 12/1991 | Sakamoto | |
| 5,446,747 A | 8/1995 | Berrou | |
| 5,587,884 A | 12/1996 | Raman | |
| 5,621,913 A * | 4/1997 | Tuttle et al. | 455/41.2 |
| 5,736,910 A | 4/1998 | Townsend | |
| 6,032,253 A | 2/2000 | Cashman | |
| 6,062,908 A | 5/2000 | Jones | |
| 6,065,027 A | 5/2000 | Cashman | |
| 6,116,963 A | 9/2000 | Shutter | |
| 6,159,050 A | 12/2000 | Belopolsky | |
| 6,176,741 B1 | 1/2001 | Shutter | |
| 6,193,560 B1 | 2/2001 | Morana | |
| 6,224,425 B1 | 5/2001 | Shutter | |
| 6,325,664 B1 | 12/2001 | Someda | |
| 6,409,548 B1 | 6/2002 | Guttierez | |
| 6,471,551 B2 | 10/2002 | Morana | |
| 6,585,540 B2 | 7/2003 | Gutierrez | |
| 6,764,343 B2 | 7/2004 | Ferentz | |
| 6,769,936 B2 | 8/2004 | Gutierrez | |
| 6,773,298 B2 | 8/2004 | Gutierrez | |
| 6,773,302 B2 | 8/2004 | Gutierrez | |
| 6,862,563 B1 | 3/2005 | Hakewill | |
| 7,321,599 B1 * | 1/2008 | Yen et al. | 370/466 |
| 2003/0040222 A1 * | 2/2003 | Price et al. | 439/638 |
| 2003/0043771 A1 * | 3/2003 | Mizutani et al. | 370/338 |
| 2003/0061344 A1 * | 3/2003 | Monroe | 709/224 |
| 2003/0095613 A1 * | 5/2003 | Kuroiwa et al. | 375/341 |
| 2003/0176091 A1 * | 9/2003 | Huang | 439/160 |
| 2003/0194908 A1 | 10/2003 | Brown et al. | |
| 2004/0059903 A1 * | 3/2004 | Smith et al. | 713/1 |
| 2004/0198429 A1 * | 10/2004 | Yen et al. | 455/556.1 |
| 2005/0084032 A1 | 4/2005 | Rosen | |

OTHER PUBLICATIONS

U.S. Appl. No. 60/529,152, filed Dec. 11, 2003, Rosen.

* cited by examiner

*Primary Examiner*—Tuan A Pham
(74) *Attorney, Agent, or Firm*—Gazdzinski & Associates, PC (57) ABSTRACT

Improved electrical connector apparatus including a wireless transceiver is disclosed. The wireless transceiver is configured to pass signals between the terminals of the connector and an external device. In one embodiment, the device comprises a complementary wireless transceiver with a PC or other computerized device. In another embodiment, the connector comprises an RJ45 modular jack, and the wireless transceiver comprises a Bluetooth transceiver. In yet another embodiment, an 802.11 transceiver is used. In yet a further embodiment, an ultrawideband (UWB) interface is used.

30 Claims, 2 Drawing Sheets

WIRELESS CONNECTOR AND METHODS

PRIORITY

This application claims priority to U.S. Provisional Patent Application No. 60/642,349 entitled "WIRELESS MODULAR JACK AND METHOD", filed Jan. 7, 2005, and incorporated herein by reference in its entirety.

BACKGROUND OF THE INVENTION

1. Field of the Invention

The present invention relates to the field of electrical connectors and plugs, including without limitation so-called "modular jacks".

2. Description of Related Technology

As electronic device integration increases, and the desire to produce progressively smaller and more compact devices increases also, there is a need to make components perform multiple functions, thereby obviating the need for additional components which can only perform a single function. This is especially true in the case of computerized devices, wherein not only PCB real estate is at a premium, but also is cost and performance.

Electrical connectors are one very common component in such devices. These may comprise, for example, connectors for LANs, printers, USB interfaces, Firewire interfaces, etc. Once common type of connector is the "modular jack", commonly used for e.g., telephones (RJ11) and data networking (RJ45).

Numerous approaches to electrical connectors, including without limitation so-called "modular jacks", exist. For example, U.S. Pat. Nos. 6,773,302 entitled "Advanced microelectronic connector assembly and method of manufacturing", 6,773,298 entitled "Connector assembly with light source sub-assemblies and method of manufacturing", 6,769,936 entitled "Connector with insert assembly and method of manufacturing", 6,585,540 entitled "Shielded microelectronic connector assembly and method of manufacturing", 6,471,551 entitled "Connector assembly with side-by-side terminal arrays", 6,409,548 entitled "Microelectronic connector with open-cavity insert", 6,325,664 entitled "Shielded microelectronic connector with indicators and method of manufacturing", 6,224,425 entitled "Simplified microelectronic connector and method of manufacturing", 6,193,560 entitled "Connector assembly with side-by-side terminal arrays", 6,176,741 entitled "Modular Microelectronic connector and method for manufacturing same", 6,159,050 entitled "Modular jack with filter insert", 6,116,963 entitled "Two-piece microelectronic connector and method", 6,062,908 entitled "High density connector modules having integral filtering components within repairable, replaceable submodules", 5,587,884 entitled "Electrical connector jack with encapsulated signal conditioning components", 5,736,910 entitled "Modular jack connector with a flexible laminate capacitor mounted on a circuit board", and 5,069,641 entitled "Modular jack", each of the foregoing patents incorporated herein by reference in its entirety, disclose various approaches to including electronic and/or integrated circuit components within such connectors. United States Patent Application Pub. No. 20030194908 to Brown, et al. published Oct. 16, 2003 entitled "Compact Serial—To Ethernet Conversion Port", also incorporated herein by reference in its entirety, discloses an Ethernet-enabled connector having LAN functionality.

Despite the foregoing, prior art approaches to connectors (including modular jacks) are very "discrete" in nature, often with many components (including integrated circuits) being disposed separate from the connector, such as on the associated PCB.

Furthermore, such prior art approaches uniformly utilize two sets of terminals or contacts for the connector; i.e., an ingress/egress, and an egress/ingress, that allow electrical signals or current to be passed from one device to another via the connector. For example, a typical modular jack has one set of terminals to mate with the modular plug, and a second set to mate with the PCB on which the connector is mounted. These many terminals (which may be ten or more in each set) not only require additional labor and handling (such as forming, soldering, etc.), but also act as miniature antennas, and radiate EMI or noise if not properly shielded.

New advances in shorter-range radio frequency data interfaces (such as UWB, WiFi, and Bluetooth) allow for significant data rates over wireless interfaces. This is especially true of UWB, since the frequency bandwidth is proportional to the data carrying capability of the interface. Such interfaces are also ideal for short range applications.

Furthermore, the prior art has treated "network" functions such as servers, etc. as necessarily being carried out by discrete or separate entities, such as a stand-alone server or blade. With the increasing speed, capability, and level of IC integration now available, an entire computer system can essentially reside on a chip (see, e.g., Motorola/Freescale MPC 8560 "PowerQUICC" SoC devices), thereby further allowing many functions to be integrated and physically and logically co-located.

Great strides have also been made in so-called "user customizable" processors, which allow the user (designer) to select not only core configuration parameters and features, but also add customized extensions to the processor to make it particularly adapted to certain purposes (such as Viterbi decode, FFTs, Turbo coding, etc.). Seminal in this technology is the ARC microprocessors and related peripherals (ARC International or Elstree, Herts, UK), as exemplified in U.S. Pat. No. 6,862,563 entitled "Method and apparatus for managing the configuration and functionality of a semiconductor design: incorporated herein by reference in its entirety. These devices represent the state of the art in terms of optimization; i.e., lowest gate count and power consumption (and die size) for a given performance (e.g., speed) requirement. Such optimization allows, inter alia, embedded devices to have exceptionally low power consumption and hence reduced power requirements. Such devices also reduce much less heat, since they have a reduced gate count (and hence power dissipation within their circuits).

Hence, what is needed is an improved connector apparatus that leverages recent advances in technology to allow for much higher levels of spatial and logical integration, reduced power consumption for mobile and embedded applications, as well as eliminating deleterious sources of noise or EMI within electronic or computerized devices.

SUMMARY OF THE INVENTION

The present invention satisfies the foregoing needs by providing both connector apparatus and associated methods employing one or more indigenous wireless interfaces.

In a first aspect, the present invention provides an improved "smart" electrical connector. In one embodiment, the connector comprises a modular jack that is equipped with a wireless interface adapted for short range wireless communication with other components, network nodes, or devices.

In a second aspect of the invention, an electrical connector with a processor adapted for data processing is disclosed. In one embodiment, the processor comprises an integrated circuit having a user-configured extensible RISC core.

In a third aspect of the invention, an exemplary internal architecture for a computerized device is disclosed. In one embodiment, the architecture uses one or more wireless-equipped connectors to transfer signals between an external device and one or more internal components of the computerized device, such as a processor or memory.

In a fourth aspect of the invention, a wireless-enabled connector is disclosed. In one embodiment, the connector comprises at least one terminal, and a wireless interface contained substantially in the connector, and the wireless interface is adapted to pass signals between the at least one terminal and another device.

In a second embodiment, the connector comprises an RJ 45 modular jack, and the terminals comprise a plurality of substantially juxtaposed terminals adapted to mate with corresponding terminals of an RJ45 modular plug.

In a third embodiment, the wireless interface comprises a high-bandwidth ultrawideband radio frequency interface.

In a fourth embodiment, the wireless interface comprises a protocol stack having at least one security protocol layer adapted to provide at least one of: (i) encryption; and (ii) authentication.

In a fifth embodiment, the interface further comprises a media access control layer for management of communications functions.

In a sixth embodiment, the interface further comprises a Wireless Application Protocol (WAP) process.

In a seventh embodiment, the interface further comprises a Session Initiation Protocol (SIP).

In an eighth embodiment, the interface further comprises a Push-to-anything (PTx) capability.

In a ninth embodiment, the connector stores data, and is adapted for transmission of the stored data over the wireless interface. The data may comprise, for example, performance-related data; (ii) maintenance-related data, and/or (iii) troubleshooting-related data.

In a tenth embodiment, the connector further comprises an integrated circuit comprising a SIP or WAP software process running thereon, and the connector functions as a SIP or WAP server or client, respectively.

In an eleventh embodiment, the connector further comprises an integrated circuit comprising a Universal Mobile Telecommunication System (UMTS) multimedia system (IMS) software process running thereon.

In a twelfth embodiment, the connector comprises power-over-Ethernet (PoE) apparatus adapted to deliver power via the connector.

In a thirteenth embodiment, the connector is mobile, and configured for connection to a parent device via a cable from the parent device, the cable carrying at least power for and signals to or from the connector.

In a fourteenth embodiment, the connector is mobile, and configured for connection to a parent device via at least a male insert adapter received at least partly within a jack or port of the parent device.

In a fifteenth embodiment, the connector is adapted to communicate wirelessly with other connectors within the same parent device.

In a sixteenth embodiment, the wireless interface is adapted to communicate according to a plurality of different wireless protocols.

In a seventeenth embodiment, the wireless interface further comprises a user-customized and extended digital processor, the user extension comprising at least one extension instruction included within the instruction set architecture of the processor and adapted to perform processing of data specifically required by a wireless protocol of the wireless interface.

In one variant, the processing comprises a Viterbi butterfly operation. In another variant, the processing comprises at least two independent and parallel steps of systematic convolutional coding, each of the coding steps taking account of all of the source data elements and providing parallel outputs of distinct series of coded data elements.

In an eighteenth embodiment, the wireless interface comprises at least one sleep mode adapted to reduce power consumption of the interface.

In a nineteenth embodiment, the wireless interface comprises an infrared interface.

In a twentieth embodiment, the connector comprises a processor having at least one computer program running thereon, the program comprising a distributed program having client and server portions.

In a twenty-first embodiment, the connector comprises a processor having at least one computer program running thereon, the program adapted to communicate with software running on a mobile personal electronic device (PED).

In a twenty-second embodiment, the connector comprises processing apparatus adapted for packet flow control.

In a twenty-third embodiment, the connector comprises a plurality of ports, at least a portion of the ports operating under the control of a host processor which implements a packet flow control algorithm.

In a twenty-fourth embodiment, the connector comprises a global positioning system (GPS) receiver.

In a twenty-fifth embodiment, the connector comprises processing apparatus configured to recognize user-specific biometric data for controlling at least data transmission through the connector.

In a twenty-sixth embodiment, the connector comprises processing apparatus configured to act as a node of a private network (VPN).

In a twenty-seventh embodiment, the connector comprises at least one radio frequency identification (RFID) device.

In a twenty-eighth embodiment, the connector comprises at least one thermal vent that penetrates a housing of the connector.

In a fifth aspect of the invention, a method of operating a connector is disclosed. In one embodiment, the connector comprises at least one terminal, and a wireless interface contained substantially therein, the wireless interface being adapted to pass signals between the at least one terminal and another device, and the method comprises: receiving signals at the connector via the at least one terminal, the signals representing data; and transmitting at least a portion of the data via the wireless interface to another device also having a wireless interface.

DETAILED DESCRIPTION

Reference is now made to the drawings wherein like numerals refer to like parts throughout.

As used herein, the term "connector" refers broadly to any device adapted to provide an electrical interface. Connectors include, without limitation, modular jacks, plug-in type connectors, coaxial cable connectors, RJ-type jacks (RJ45, RJ11, RJ21, etc.), and USB connectors, as well as any hybrids or combinations thereof. As used herein, the term "modular plug" is meant to include any type of electrical connector designed for mating with a corresponding component or receptacle for transmitting electrical or light energy. For example, the well known "RJ" type plugs (e.g., RJ11 or RJ45) comprise modular plugs; however, it will be recognized that the present invention is in no way limited to such devices.

As used herein, the terms "network" and "bearer network" refer generally to any type of telecommunications or data network including, without limitation, hybrid fiber coax (HFC) networks, satellite networks, telco networks, and data networks (including MANs, WANs, LANs, WLANs, internets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols (e.g., SONET, DOCSIS, IEEE Std. 802.3, ATM, X.25, Frame Relay, 3GPP, 3GPP2, WAP, SIP, UDP, FTP, RTP/RTCP, H.323, etc.).

As used herein, the terms "client device" and "end user device" include, but are not limited to, personal computers (PCs) and minicomputers, whether desktop, laptop, or otherwise, set-top boxes or other CPE such as the Motorola DCT2XXX/5XXX and Scientific Atlanta Explorer 2XXX/3XXX/4XXX/8XXX series digital devices, personal digital assistants (PDAs) such as the RIM Blackberry or "Palm®" family of devices, handheld computers, personal communicators such as the Motorola Accompli or MPx 220 devices, J2ME equipped devices, cellular telephones, or literally any other device capable of interchanging data with a network.

Similarly, the terms "Customer Premises Equipment (CPE)" and "host device" refer to any type of electronic equipment located within a customer's or user's premises and connected to a network. The term "host device" refers generally to a terminal device that has access to digital television content via a satellite, cable, or terrestrial network. The host device functionality may be integrated into a digital television (DTV) set. The term "customer premises equipment" (CPE) includes such electronic equipment such as set-top boxes, televisions, Digital Video Recorders (DVR), gateway storage devices (Furnace), and ITV Personal Computers.

As used herein, the term "network agent" refers to any network entity (whether software, firmware, and/or hardware based) adapted to perform one or more specific purposes. For example, a network agent may comprise a computer program running in server belonging to a network operator, which is in communication with one or more processes on a CPE or other device.

The term "processor" is meant to include any integrated circuit or other electronic device (or collection of devices) capable of performing an operation on at least one instruction including, without limitation, reduced instruction set core (RISC) processors, CISC microprocessors, microcontroller units (MCUs), CISC-based central processing units (CPUs), and digital signal processors (DSPs). The hardware of such devices may be integrated onto a single substrate (e.g., silicon "die"), or distributed among two or more substrates. Furthermore, various functional aspects of the processor may be implemented solely as software or firmware associated with the processor.

As used herein, the terms "computer program", "routine," and "subroutine" are substantially synonymous, with "computer program" being used typically (but not exclusively) to describe collections or groups of the latter two elements. Such programs and routines/subroutines may be rendered in any language including, without limitation, C#, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ and the like. In general, however, all of the aforementioned terms as used herein are meant to encompass any series of logical steps performed in a sequence to accomplish a given purpose.

DESCRIPTION OF EXEMPLARY EMBODIMENTS

Numerous approaches to electrical connectors, including without limitation so-called "modular jacks", exist. For example, U.S. Pat. Nos. 6,773,302 entitled "Advanced microelectronic connector assembly and method of manufacturing", 6,773,298 entitled "Connector assembly with light source sub-assemblies and method of manufacturing", 6,769,936 entitled "Connector with insert assembly and method of manufacturing", 6,585,540 entitled "Shielded microelectronic connector assembly and method of manufacturing", 6,471,551 entitled "Connector assembly with side-by-side terminal arrays", 6,409,548 entitled "Microelectronic connector with open-cavity insert", 6,325,664 entitled "Shielded microelectronic connector with indicators and method of manufacturing", 6,224,425 entitled "Simplified microelectronic connector and method of manufacturing", 6,193,560 entitled "Connector assembly with side-by-side terminal arrays", 6,176,741 entitled "Modular Microelectronic connector and method for manufacturing same", 6,159,050 entitled "Modular jack with filter insert", 6,116,963 entitled "Two-piece microelectronic connector and method", 6,062,908 entitled "High density connector modules having integral filtering components within repairable, replaceable submodules", 5,587,884 entitled "Electrical connector jack with encapsulated signal conditioning components", 5,736,910 entitled "Modular jack connector with a flexible laminate capacitor mounted on a circuit board", and 5,069,641 entitled "Modular jack", each of the foregoing patents incorporated herein by reference in its entirety, disclose various approaches to including electronic and/or integrated circuit components within such connectors. United States Patent Application Pub. No. 20030194908 to Brown, et al. published Oct. 16, 2003 entitled "Compact Serial—To Ethernet Conversion Port", also incorporated herein by reference in its entirety, discloses an Ethernet-enabled connector having LAN functionality.

In a first aspect of the invention, a connector 100 or jack having a wireless interface is disclosed. In one embodiment (FIG. 1), the connector comprises an exemplary RJ45 form factor having a radio frequency chipset disposed within the back end thereof. Literally any type of form factor may be used with the present invention, however, subject to the particular requirements of heat dissipation, required functionality, desired cost, available substrate or PCB footprint, etc., the illustrated embodiment of the connector 100 uses a Bluetooth FHSS radio interface 102 as described in greater detail below, although it will be appreciated that literally any type of air interface may be used including, without limitation, those complying with IEEE-802.11a/b/g, time-modulated UWB, DSSS or OFDM UWB (802.15 PAN), IrDA, or even holographic RF or wideband such as described in U.S. Pat. No. 4,972,480 issued Nov. 20, 1990 and entitled "Holographic Communications Device and Method", and co-pending U.S.

application Ser. No. 10/868,420 entitled "WIDEBAND HOLOGRAPHIC COMMUNICATIONS APPARATUS AND METHODS" filed Jun. 14, 2004, which claims priority to U.S. Provisional Patent Application Ser. No. 60/529,152 filed Dec. 11, 2003 of the same title, each of the foregoing incorporated herein by reference in its entirety.

The connector 100 further comprises a modular plug receptacle for receiving, e.g., an RJ-type plug, as well as a plurality of leads which pass the signal between the plug and the various backend components, the latter optionally including signal conditioning components such as filters (e.g., choke coils/inductive reactors), capacitors, inductors, and even a so-called "Bob Smith" common mode termination of multiple resistors and one or more capacitors shunted to ground or the connector Faraday shield (if installed; not shown); see, e.g., U.S. Pat. No. 5,736,910 previously incorporated. Many such configurations readily known to those of ordinary skill can be employed consistent with the present invention. These signal conditioning components may be disposed on or within a substrate inside the connector 100, within a potting compound or encapsulant, an interlock base or similar component holder such as described in the foregoing patents, or even suspended in free space within the volume of the connector. If one or more internal substrates are used (as in FIG. 1), these may be disposed in literally any non-interfering orientation within the connector housing, including vertically, horizontally, and so forth. It will be appreciated that the invention is in no way limited to the exemplary configuration of FIG. 1, such configuration being merely illustrative.

Figure 1:
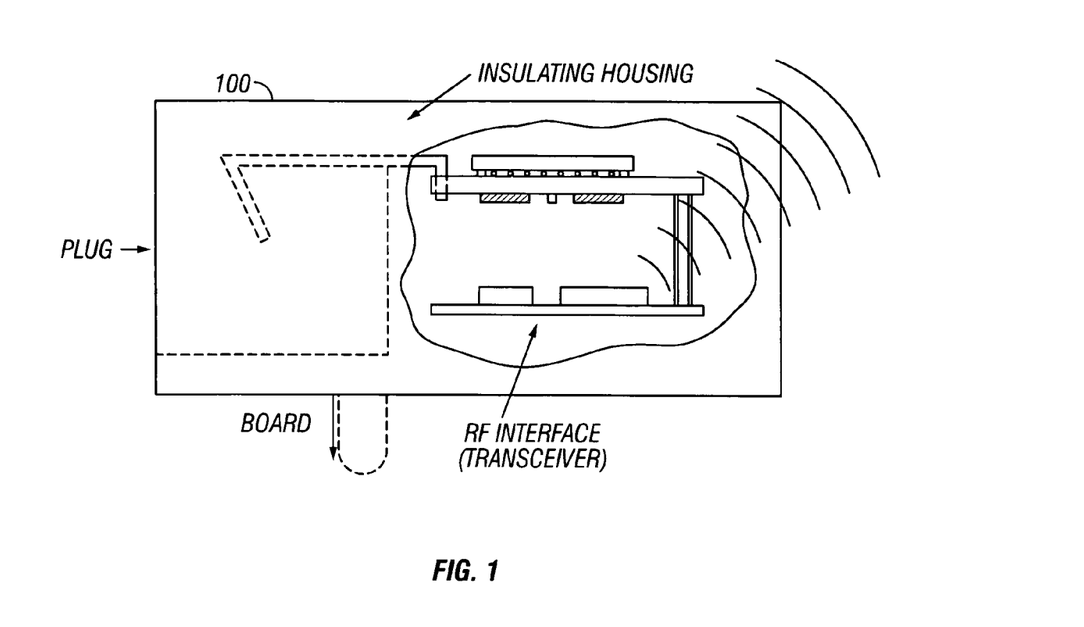
FIG. 1 is side elevational view (partial cutaway) of a first embodiment of the connector of the present invention.
Figure 2:
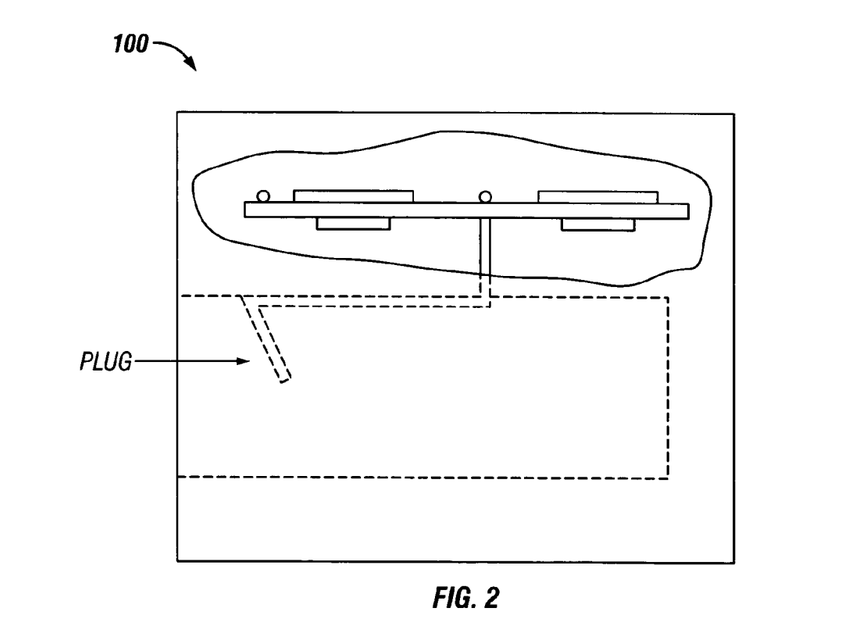
FIG. 2 is side elevational view (partial cutaway) of a second embodiment of the connector of the present invention, wherein footprint size is traded for vertical profile.

Similarly, the connector may be fitted with indicators, such as LEDs, light pipes, LCD indicators, TFT indicators, or any other desired approach which is consistent with the functionality and required EMI profile of the integrated circuits.

Any number of commercially available and small form factor Bluetooth solutions may be used consistent with the embodiment of FIG. 1. For example, the SiW1502 Radio Modem IC manufactured by Silicon Wave Corporation of San Diego, Calif., is a low-power consumption device with integrated RF logic and Bluetooth protocol stack adapted for Bluetooth applications. The chip is a fully integrated 2.4 GHz radio transceiver with a GFSK modem contained on a single chip. The SiW1502 chip is offered as a stand alone IC or, may be obtained with the Silicon Wave Odyssey SiW1601 Link Controller IC. The SiW1502 form factor is 7.0×7.0×1.0 mm package which is readily disposed within the interior volume of the connector 100. An RF transceiver and modulator device is adapted to generally comply with the well-known "Bluetooth™" wireless interface standard. The Bluetooth wireless technology allows users to make generally short-range wireless and instant connections between various communication devices, such as mobile devices (e.g., cellular telephones, PDAs, notebook computers, remote monitoring stations, and the like) and desktop computers or other fixed devices. Since Bluetooth uses radio frequency transmission, transfer of data is in real-time.

The Bluetooth topology supports both point-to-point and point-to-multipoint connections. Multiple 'slave' devices can be set to communicate with a 'master' device. The devices are authenticated (optionally) using a RAND-based bonding or pairing process of the type well known in the art (e.g., in Mode 3 link layer security, or Mode 2 "L2CAP" or service-based security). In this fashion, the connector 100 of the present invention, when outfitted with a Bluetooth wireless suite, may communicate directly with other Bluetooth compliant mobile or fixed devices including other connectors within the same or a different device, a subject's cellular telephone, PDA, notebook computer, desktop computer, or other devices. Alternatively, a number of different RF-enabled connectors may be monitored and interfaced in real time at a centralized location, such as e.g., a "master" Bluetooth node located on the same motherboard as a Bluetooth equipped connector.

Bluetooth-compliant devices, inter alia, operate in the 2.4 GHz ISM band. The ISM band is dedicated to unlicensed users, thereby advantageously allowing for unrestricted spectral access. The exemplary modulator uses one or more variants of frequency shift keying, such as Gaussian Frequency Shift Keying (GFSK) or Gaussian Minimum Shift keying (GMSK) of the type well known in the art to modulate data onto the carrier(s), although other types of modulation (such as phase modulation or amplitude modulation) may be used.

Spectral access of the device is accomplished via frequency hopping spread spectrum (FHSS), although other approaches such as frequency divided multiple access (FDMA), direct sequence spread spectrum (DSSS, including code division multiple access) using a pseudo-noise spreading code, OFDM, or even time division multiple access may be used depending on the needs of the user. For example, devices complying with IEEE Std. 802.11a/b/f/g may be substituted for the Bluetooth transceiver/modulator arrangement previously described if desired. Literally any wireless interface capable of accommodating the bandwidth and/or other requirements of the system may be used.

For example, in the case of an electronic host device, a UWB system such as that described below may be considered optimal, due to its low radiated power level, e.g., less than −41.3 dBm/MHz according the FCC unlicensed spectral UWB mask. This low power reduces the chance of deleterious interference with, e.g., other communications systems, data or control functions, etc. The UWB approach also obviates heterodyning and even power amplification in some applications, thereby greatly reducing the complexity of the radio chipset/SoC within the connector. This in turn allows a lower gate count device to be used, which reduces power consumption and heat generation significantly.

In one embodiment, the communications interface of the connector 100 comprises with a TM-UWB SoC device which utilizes pulse-position modulation (PPM), wherein short duration Gaussian pulses (nanosecond duration) of radio-frequency energy are transmitted at random or pseudo-random intervals and frequencies to convey coded information. Information is coded (modulated) onto the short duration carrier pulses by, inter alia, time-domain shifting of the pulse. For example, a pulse encodes a bit by being temporal shifting of the pulse with respect to a reference, such that a "late" pulse encodes a "0", while an early pulse encodes a "1". This scheme is somewhat akin to the well known frequency shift keying (FSK), wherein two (or more) side-band frequencies are utilized to encode data; e.g., 67 kHz down-shift=0; 67 kHz up-shift=1. TM-UWB devices have the advantage of ready penetration of various mediums, as well as ultra-low power consumption and low spectral density, thereby reducing power requirements and potential interference with other device, respectively. In one exemplary variant, the TM-UWB device of the invention comprises a half duplex, 2.0 GHz with variable data rate in excess of 1 Mbps with no forward error correction (FEC). The Gaussian monopulse is of the form:

$$V(t) = (t/\tau) e^{-(t/\tau)^2}$$

Where $\tau$ is a time decay constant related to the Gaussian monopulse duration, and center frequency $f_c = k/\tau$. The monopulse's bandwidth and center frequency are therefore directly related to the monopulse's temporal width or duration. This approach also shifts the transmission time of each monopulse over a significant time interval in accordance with a pseudo-nose (pn) "hopping" code of the type well known in the art, thereby advantageously distributing spectral density to make the spread. This approach is roughly comparable to frequency hopping spread spectrum (FHSS) except in the time domain. Exemplary devices incorporating TM-UWB components including the timer, correlator, and digital baseband signal processor and controller units (not shown) are available from IBM Corporation (SiGe or silicon germanium-based) in the form of a chip set, although it will be recognized that an integrated single device is optimal for the invention. Additional detail on the implementation of TM-UWB systems is found in, e.g., "*Time Modulated Ultra-Wideband for Wireless Applications*"; Time-Domain Corporation, 2000, which is incorporated herein by reference in its entirety.

As is well known, UWB communications have very high data rates along with high bandwidth and low radiated power levels, which are in effect traded from shorter propagation distances. Hence, UWB is ideal for a "PAN" or subnet of connectors 100 or connector-equipped devices in close proximity. The low radiated power levels and UWB modulation techniques are also substantially non-interfering with other devices in close proximity.

One of the intrinsic benefits of the illustrated embodiment of the connector is the lack of motherboard (secondary) terminals typically used to electrically interface the connector with its motherboard or other external device. Specifically, all signals passing to or from the connector on the device side (i.e., not via the modular plug) are passed via the radio interface. This can also be used to simplify the internal signal paths of the parent device in which the connector is used; for example a PC using the present connector 100 need not have the PCB wiring, supporting buswork, etc. needed to pass a traditional electrical signal to or from the connector.

The radio interface or SoC device may also comprise a LAN (e.g., Ethernet) or other communications media access control (MAC) layer for management of communications functions such as server, as is well known in the networking and communication arts. Other higher layer protocols, such as the well known Motorola SyncML protocol (used for synchronization and data communication), Wireless Application Protocol (WAP), SMS, H.323, or Session Initiation Protocol (SIP) can also ride atop the Bluetooth or other RF PHY layers for any number of functions that the connector can be configured to perform. For example, in one variant, the connector can log data (such as in a local memory), and be externally instigated (or periodically/anecdotally self-initiate) to package and transmit the logged data over the air interface, such as for performance, maintenance, troubleshooting, etc. reasons.

Using an installed SIP or WAP client, the connector SoC may also act as a SIP/WAP server or client, including for example videoconferencing applications over Ethernet, 3G UMTS IMS functionality, multimedia streaming sessions, and so forth. Other functions may also be present, such as application, session, or link layer encryption, etc.

In another embodiment, a power-over-Ethernet (PoE) functionality is included within the connector 100. See, e.g., U.S. Pat. No. 6,764,343 to Ferentz, issued Jul. 20, 2004 and entitled "Active local area network connector", incorporated herein by reference in its entirety. This approach may also be hybridized; e.g., where the connector 100 has motherboard terminals, yet these are not signal carrying paths, but rather used for other functions such as power delivery to or form the connector.

In another embodiment, the connector can simply be carried in the user's pocket or bag, such that a non-Bluetooth or wireless device can instantly be converted. For example, the connector may be attached to the free end of an Ethernet cable communicating with a non-RF laptop or PDA, thereby instantly giving the laptop or PDA Ethernet-based wireless connectivity with other comparably equipped (e.g., Bluetooth) devices within range. Alternatively, the connector may simply comprise a male insert adapter or the like so that it can be plugged directly into the RJ45 or similar networking port on the laptop or PDA. Myriad other approaches are possible.

Figure 3:
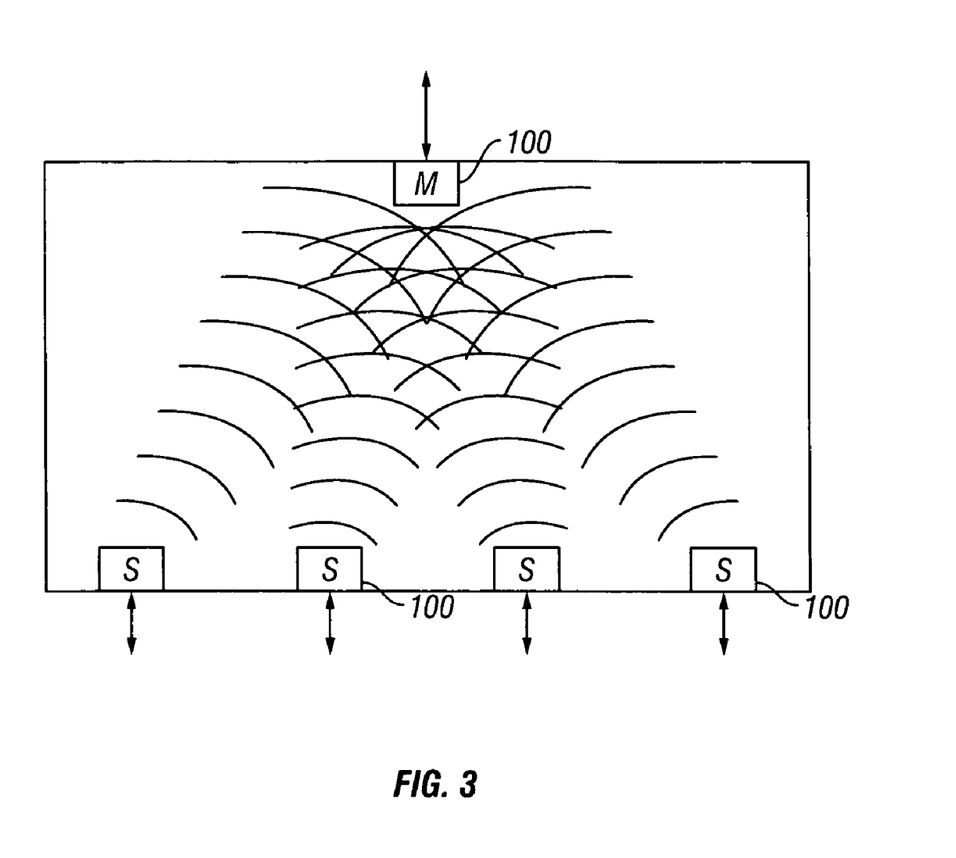
FIG. 3 is block diagram of an exemplary electronic device adapted to provide interface between connectors, such as for example a Bluetooth master with multiple slaves, or a WiFi (802.11) AP with multiple STAs.

The connector 100 may also be used with other connectors within a given device (see FIG. 3), such as for a (internally) wireless network hub, such that multiple LANs or network capable devices can be connected via a Bluetooth piconet or scatternet, UWB network, etc. For example, the hub might have ports for four different RJ45 connectors, with each connector communicating with the others via the Bluetooth interfaces in each connector (and their associated protocols).

In another embodiment, the connector 100 includes a fully integrated low-voltage "system on a chip" (SoC) application specific integrated circuit (ASIC) of the type generally known in the semiconductor fabrication arts. The SoC ASIC incorporates, inter alia, a digital processor core, embedded program and data random access memories, radio frequency (RF) transceiver circuitry, modulator, analog-to-digital converter (ADC), and analog interface circuitry. The digital processor core of the illustrated embodiment comprises an extensible reduced instruction set computer (RISC) which is advantageously selected to be user-configurable with respect to one or more sets of predetermined extension instructions. It will be recognized, however, that a variety of core architectures and features may be used, however, depending on the particular purpose, including Harvard architecture (separate program and data busses), very long instruction word (VLIW), multiple multiply-accumulate stages (e.g., dual MAC), etc.

The set(s) of instructions of the RISC core of the present embodiment is/are specifically adapted to efficiently perform various processing computations (such as multiply-accumulate (MAC) operations) and tasks associated with the different various embodiments of the connector described herein. For example, signal processing, filtering and/or data compression algorithms of the type well known in the art may be enhanced through use of an optimized instruction set specifically adapted to those algorithms. Similarly other signal processing algorithms may be enhanced through selection of an instruction set adapted to perform, inter alia, fast Fourier transforms (FFTs) and associated "butterfly" calculations (e.g., Viterbi butterfly for wireless coding), turbo coding calculations (see, e.g., U.S. Pat. No. 5,446,747 to Berrou entitled "Error-correction coding method with at least two systematic convolutional codings in parallel, corresponding iterative decoding method, decoding module and decoder", incorporated herein by reference in its entirety), time frequency distribution calculations (e.g., spectrograms) and associated windowing functions, or discrete wavelet transforms (such as the well known Haar wavelet transform). On-/off-connector communications may further be enhanced through improved execution of cyclic redundancy code (CRC) calculations for use in error detection.

Such user-customized and optimized extensible processor cores advantageously have a reduced gate count requiring less silicon than comparable non-optimized cores or multi-purpose (e.g., "CISC") processor designs, since the selection of a highly optimized instruction set substantially eliminates non-essential functionality during processor design synthesis and fabrication. With lower gate count, static and switching power losses are reduced, thereby providing the further benefits of reduced power consumption and lower rates of heat generation. Accordingly, with the present invention, the manufacturer or designer may advantageously select the appropriate optimized core configuration and instruction set applicable to the anticipated use of the connector, thereby reducing the required space needed within the connector to accommodate the ASIC to the absolute minimum consistent with the extant or subsequently developed semiconductor fabrication process employed, and the power consumed and heat generated thereby.

Additionally, the core (and in fact the entire SoC device) optionally includes one or more processor "sleep" modes of the type well known in the digital processor arts, which allow portions of the core and/or peripherals to be shut down during periods of non-operation in order to further conserve power within the device and reduce heat generation. This may be very important in mobile devices which have finite power storage. For example, the pipeline and memory can be selectively shut down to significantly reduce power consumption when these components are not required (e.g., the connector is dormant before activation). It will further be appreciated that the aforementioned sleep modes may be preprogrammed; e.g., upon the occurrence of (or lack of) a certain event, such as the passing of a predetermined number of processor clock cycles, falling below a certain battery voltage level, etc. Alternatively, the sleep modes may be actively invoked.

The processor core of the present embodiment comprises an extensible RISC processor of the design provided by ARC International of Elstree, Herts, UK, although other configurations may be used. For example, an ARC 600 or ARC 700 core may be employed. The construction of optimized, extended instructions and instruction sets is well known in the processor design arts, and is described, for example, in U.S. Pat. No. 6,032,253 entitled "Data Processor with Multiple Compare Extension Instruction" issued Feb. 29, 2000, and U.S. Pat. No. 6,065,027 entitled "Data Processor with Up Pointer Walk Trie Traversal Instruction Set Extension" issued May 16, 2000, both or which are incorporated herein by reference in their entirety.

The SoC device (including core) design is generated using VHSIC Hardware Description language (VHDL) or Verilog in conjunction with design and synthesis tools of the type well known in the art. An International Business Machines (IBM) "Blue Logic™" 0.11 micron Cu-11 ASIC process is used to fabricate the device of the illustrated embodiment, although other semiconductor fabrications processes including for example 0.35 micron or 0.18 micron may be substituted, depending on the degree of integration required. The IBM process further affords ultra-low power consumption by the device (1.5 V supply, which reduces power consumption by more than 50% over comparable 3.3 V devices). It will be recognized, however, that such higher voltage processes and devices may be substituted consistent with the integration and power requirements of the connector.

In another embodiment, the connector 100 includes an infrared (e.g., IrDA) interface of the type well known in the networking arts. This is useful where there is a line-of-sight (LOS) maintained between the connector 100 and other devices with which it is to communicate. This approach obviates much of the radiated electromagnetic energy associated with the RF interfaces.

As previously referenced, it will be recognized that any desired higher layer functionality of the connector 100 may be embodied in the form of one or more computer programs. Such program(s) may be rendered in virtually any programming language/environment including for example C, C++, Java, Fortran, Basic, Visual Basic, Unix, Perl, CORBA, assembly language, or any other medium capable of reasonably implementing such a functionality.

In another exemplary embodiment of the system, an object-oriented distributed program having client and server portions distributed on respective client and server devices within the piconet. For example, one connector may act as a Bluetooth "server" (e.g., at the radio PHY and link/L2CAP layers) while also acting as a higher (e.g., application layer) server under a distributed application (DA) paradigm.

The distributed software embodiment of the connector utilizes a server portion and client portion distributed on respective server and client devices, disposed at the same or different physical locations, and in data communication with each other via the wireless interface or a network. The client portion of the software can be made very "thin" to accommodate the comparatively lower hardware capabilities associated with the connector 100, for example. This architecture is especially well suited to an object oriented programming environment (e.g., CORBA), as will be recognized by those of ordinary skill. In use, the connector automatically or manually establishes communication between itself and the sever portion, thereby allowing for transfer of data.

The foregoing architecture may also be used to remotely initiate processes on other devices, such as other connectors, PEDs, CPE, "smart" phones, network agents, or home PCs. For example, in one exemplary variant, the client device software is programmed to initiate an O/S window or Java applet running on a J2ME or equivalent equipped distant (e.g., PED) device upon transmission of a prompt or another signal corresponding to a given event occurring on the connector.

In another embodiment of the invention, the connector comprises a SIP (Session Initiation Protocol) or WAP enabled device that can used to establish a secure user session to transmit the required information. In one variant, an approach somewhat analogous to "PoC" (Push-to-talk over cellular) is used, wherein the connector includes an architecture that supports instantaneous communications via, e.g., the aforementioned SIP protocol layered over the Bluetooth or other wireless architecture of the type well known in the communications arts. Such communications can be instigated by a higher layer process or application running on the connector SoC, on another device, by a signal generated by a microcontroller also included within the connector 100 (not shown), and so forth.

The aforementioned microcontroller may also be used to control other facets of the connector operation, such as indicator management, power or PoE management, and the like.

The connector acting as a client, proxy or server may also require authentication of the link partner (or mutual authentication) before any data push or pull is allowed, such as via a RAND challenge-based approach or the like. This helps mitigate "spoofing" or surreptitious denial of service to the user, and substitution of an unauthorized device, or reception of the data by an unauthorized device.

In another embodiment, the connector 100 may be used as a buffering mechanism and/or for packet flow control. Each connector in a multi-port (multi-connector) device, for example, may have its own FIFO and flow control capability, thereby allowing for the queuing of packets upon receipt or before transmission. In this regard, one or more connectors may act as a "network processor", such as under the control of a host processor which implements a packet flow control algorithm using each of the multiple connectors as packet interfaces. For example, round-robin, non-blocking, statistical multiplexing, and other types of packet/bandwidth management approaches may be readily implemented using the invention.

In another embodiment, the connector 100 may be equipped with a GPS, Assisted GPS (A-GPS), or other such locating system can be used to provide location information. Specifically, in one variant, the GPS/A-GPS system is prompted to save the coordinates of a particular location where the connector (e.g., as used on a mobile device such as a laptop or the like). For example, a user may want his/her present location determined without having to instigate a similar procedure via their cellular phone or the like; this can be accomplished by activating a function which causes the GPS receiver to store its present location data internally, or transmit to another device. Alternatively, the user can maintain a log or listing of saved GPS coordinates (and or address information) for easy recall at a later date.

In a manner somewhat analogous to the GPS/A-GPS, the connector can also use its higher level client process to exchange information with other devices (such as via a Bluetooth "discovery" process or OBEX object exchange managed by an application which uses the Bluetooth HCI interface, etc.).

In another embodiment, user-specific biometric data can be used alone or in conjunction with other data sources to authenticate a user and/or allow the passage of data through the connector. For example, in one variant, the user's fingerprint, retinal scan, facial recognition software scan, or voiceprint are used alone or in a two-of-two, three-of-three, etc. coincidence circuit; i.e., when all inputs can be authenticated and correlated to one individual, the connector 100 will perform the desired or required function. In this fashion, access of data passed through the connector is protected.

As yet another option, the interface between the connector and any other entity or its proxy and the user may be implemented using a virtual private network (VPN) of the type well known in the art, which provided secure end-to-end communications between two or more points via an untrusted network such as the Internet. This embodiment may be implemented via the aforementioned WAP/WTLS technology suite and associated protocol stacks, through a dedicated or shared RADIUS server and tunneled packets, or any other comparable arrangement capable of restricting access to the transmissions, database or other repositories of information to only authorized personnel. For example, the connector 100 may have a WAP stack with a WTLS or TLS security layer and WSP session protocol for establishing a secured session tunneled across an untrusted interposed network (e.g., the Bluetooth piconet) or interface operating according to a given bearer transport and network protocol (such as TCP/IP).

Yet another embodiment of the invention is described having a radio frequency identification (RFID) tag installed within or made part of the connector 100 to provide a variety of functions, including (i) retention of application- or context-specific data; (ii) connector inventory and security after manufacture; (iii) selective interrogation of connectors; and (iv) writing or reading data to or from multiple connectors simultaneously.

RFID tags are well known in the communications art. The main advantages of an RFID sensor and tag system over other forms of ID tagging include (a) the orientation of the tag with respect to the sensor is not critical for a correct read of the tag information; (b) communication can occur within comparatively harsh operating; and (c) the communication range between the sensor and tag can be significant (up to several hundred meters) even when the RF frequencies used are within the power limitations of Federal Communications Commission (FCC) rules concerning unlicensed transmitters. Accordingly, RFID technology is useful for several applications, especially those relating to security and asset management.

The process of "reading" and communicating with an RFID tag such as that used in the connector comprises bringing a RFID tag within proximity to an RFID sensor ("reader") which emanates a radio frequency wake-up field having a limited range. The RFID tag detects the presence of the wakeup field of the sensor, and subsequently various forms or protocols of handshake occur between the tag and the sensor in order to exchange data. All of this communication between the tag and the sensor is performed using RF carriers of one or more prescribed frequencies. As is well known in the art, so-called "low-frequency" systems operate in the kHz to low-MHz range (unlicensed). Low frequency systems are generally low cost and complexity and have comparatively limited range, but are attractive since the low frequency energy tends to suffer low losses from materials like metal, polymers, and the like. High-frequency systems operate in the low-MHz to GHz range (often licensed). High-frequency systems in general have greater range, but are more directional. Additionally, the performance of these high frequency tags may be adversely affected by electromagnetic radiation or proximate metallic objects.

Additionally, RFID tags are generally categorized as being "active" (i.e., carry an associated power source for operation of the on-tag integrated circuit, and are capable of spontaneous transmission after reader interrogation), or "passive" which utilizes incident RF energy (from the reader, for example) to generate electrical energy for use by the IC, and transmission. Passive tags are highly energy efficient, and require only a small amount of electrical power to function.

In the present application, due to the premium on space within the connector 100, a small antenna and package form factor (less than about 10 mm across) is required. Based on the foregoing considerations, the present embodiment of the invention utilizes a high frequency (e.g., 15 GHz nominal) miniature passive tag having a miniature monopole antenna of the type well known in the art, although it will be recognized that active tag architectures, lower or higher frequency systems, and alternate antenna configurations (such as "FIG. 8" loop, etc.) may be used depending on the particular application. A nominal frequency of 15 GHz is used as the carrier for the system, 10 mm corresponding to about one-half wave-length at that frequency.

The RFID tag of the present invention further includes an integrated circuit (IC) device including a transceiver section and processing logic, as well as an integrated random access memory (RAM) device of the type commonly available with such devices adapted to store a plurality of data bytes such as data correlating to an individual application, manufacturer, security data, etc. The memory device may also comprise, without limitation, PROMS, EPROMS, EEPROMs, UVE-PROMS, SRAMs, DRAMs, SDRAMS and ferroelectric memory devices. The memory of the present embodiment is effectively independent of the on-connector memory (e.g. DSP "flash" or discrete memory previously described herein). In this capacity, the construction of the connector 100 is simplified, and less complex or even "off the shelf" RFID devices meeting the physical space limitations may be used with little or no adaptation.

It will be recognized, however, that if data communication between the RFID memory and other memory devices or signal processing disposed on-connector or off-connector is desirable, such communication may be affected via techniques well known in the electronic arts. The present invention further contemplates, in an alternate embodiment, the integration of the RFID "tag" components including memory into a single silicon or semiconducting die, such as in the form of the aforementioned ASIC. Such embodiment has the advantage, inter alia, of further conserving on space within the connector.

In yet another embodiment, the RFID tag is distributed on one or more surfaces of the connector. See for example the "Bistatix™" RFID devices formerly manufactured by Motorola Corporation, which utilize a very thin and low cost substrate employing printed circuit technology. Hence, by employing the Bistatix technology within the RFID tag of the present invention, the RFID tag may be disposed on any surface within the connector, such as the interior of the housing, on an unused section of PCBA, etc.

In operation, the tag "reader" interrogates the connector and RFID device at its designated frequency, causing the tag to "wake" and initiate communications protocols disposed within the tag memory. Once such protocols are established, the reader transmits preformatted data representative of the parameters desired to be loaded into the RFID memory device.

In yet another embodiment, the tag is coupled to a microcontroller IC of the connector, thereby allowing the tag to "wake up" the connector indirectly. In this fashion, the connector may be completely powered down until it is awaken by the tag, thereby providing significant power savings prior to operation on a mobile or other power-limited device. Such power savings are even greater than those provided by the processor "sleep mode" previously described above, in that when using the RFID tag wake up feature, the digital processor core of the ASIC may be completely shut down, including clock generator, pipeline, and (static) memory. Such complete shut down is possible since the passive tag generates a small amount of electrical power, on the order of a few mW, sufficient to re-initiate processor (and connector) operation on the battery or other power source providing electrical power after wake-up. It will be recognized, however, that the transceiver may alternatively be constructed to generate the required electrical power upon "interrogation" by a complementary RF transmitter.

The RFID tag has further utility for conducting inventory of "smart" connectors after manufacture. Since each connector carries its own tag, each capable of uniquely to identifying itself (whether by unique frequency assignment, or data encoded on the tag memory and transmitted to the reader), rapid reading of a plurality of tags disposed in close proximity to one another is possible. For example, since the connectors may be a valuable and easily pilferable commodity, regular inventory can be rapidly accomplished using the aforementioned RFID technology.

In yet another application, the foregoing unique identification capability of the tag coupled with the range of the high-frequency antenna system allows for the selective interrogation of the tag so as to load information, retrieve data, or initiate connector functions (such as wake up) while in proximity to other similar devices. For example, it is contemplated that the smart connector 100 of the invention will be used in, inter alia, applications wherein several such connectors or similarly equipped devices are used in close proximity. Rather than having to individually interrogate each tag by physically disposing it local to a communications device or reader, one may selectively interrogate any tag within range of a central reader (not shown) to upload information and/or induce wake-up of the tag and its associated connector, and the collection of data, or alternatively conduct other types of operations. Such central reader may further be programmed to automatically initiate and monitor such activities, such as through a software routine running on a processor disposed within the central reader. Many other control schemes are possible (e.g., upon the occurrence of predetermined events, the passage of time, a signal generated by the connector, and may be used in place of or in combination with the techniques previously described.

It will be appreciated that many different variations and combinations of the foregoing radio frequency communications apparatus and methods may be employed consistent with the invention; such different variations and combinations being prohibitively numerous to describe herein. All such variations and combinations, however, are easily recognized and within the possession of those of ordinary skill provided the present disclosure.

In another aspect of the invention, the connector 100 may also include thermal ports or vents (e.g., that penetrate the housing and/or Faraday shield if installed) that allow for increased airflow and heat rejection under high load conditions. Specifically, in one embodiment, a port is cut through the top portion of the insulating connector housing above the integrated circuits/radio chipset, and merely covered by a specially constructed Faraday (noise) shield that has a thermal vent coincident with the port of the housing. The thermal vent comprises a louvered region of the shield, or alternatively in another embodiment a bimetallic strip (i.e., a strip of dissimilar metals or other materials) that progressively deflects as temperature increases within the connector 100 to form an airflow channel from the connector housing interior through the strip aperture and out to the exterior of the connector. When cool, the strip substantially covers the port, thereby precluding airflow and also rejecting dirt and other environmental factors from accessing the connector interior volume.

It will be recognized that while certain aspects of the invention are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. The foregoing description is of the best mode presently contemplated of carrying out the invention. This description is in no way meant to be limiting, but rather should be taken as illustrative of the general principles of the invention. The scope of the invention should be determined with reference to the claims.

What is claimed is:

1. A method of operating a connector having a body and at least one terminal, and a wireless interface contained substantially within said body of said connector, said wireless interface being adapted to pass wireless signals between said at least one terminal and at least one other device disposed within the same host device in which said connector is disposed, said at least one other device having a second wireless interface, the method comprising:

receiving signals at said connector via said at least one terminal, said signals representing data; and transmitting at least a portion of said data via said wireless interface to said at least one other device disposed within said host device.

2. The connector method of claim 1, wherein said at least one other device is associated with the same host device and said second wireless interface comprises a wireless interface adapted to communicate with said wireless interface of said connector according to a common air interface and communications protocol.

3. The method of claim 1, wherein said at least one other device is disposed on a common substrate of said host device with said connector, but not in signal communication therewith.

4. The method of claim 2, wherein said common air interface comprises an ultrawideband (UWB) air interface.

5. The method of claim 2, wherein said common air interface comprises a short-range personal area networking (PAN) air interface.

6. The method of claim 1, further comprising at least one second terminal, said at least one second terminal being adapted for electrical communication with at least one circuit trace on a substrate of said host device and said at least one terminal.

7. The method of claim 1, wherein said at least one other device comprises a plurality of devices each having wireless interfaces capable of communicating with said wireless interface of said connector in a substantially simultaneous fashion.

8. A connector having:
at least one terminal adapted for mating to a corresponding terminal on a plug receivable at least partly within said connector; and
a wireless interface contained at least partly within said connector, said wireless interface being adapted to pass signals between said at least one terminal and at least one other device, said wireless interface further comprising a user-customized and extended digital processor, said user extension comprising at least one extension instruction included within the instruction set architecture of said processor and adapted to perform processing of data specifically required by a wireless protocol of said wireless interface, said processing comprising at least two independent and parallel steps of systematic convolutional coding, each of said coding steps taking account of all of said source data elements and providing parallel outputs of distinct series of coded data elements;
wherein said connector is adapted for mounting on a substrate within a host device.

9. A connector having:
at least one terminal adapted for mating to a corresponding terminal on a plug receivable at least partly within said connector; and
a wireless interface contained at least partly within said connector, said wireless interface being adapted to pass signals between said at least one terminal and at least one other device, said wireless interface further comprising a digital processor adapted to perform processing of data specifically required by a wireless protocol of said wireless interface, said processing comprising at least two independent and parallel steps of systematic convolutional coding, each of said coding steps taking account of all of said source data elements and providing parallel outputs of distinct series of coded data elements; wherein said connector is adapted for mounting on a substrate within a host device.

10. The connector of claim 9, wherein said connector comprises an RJ45 connector.

11. The connector of claim 9, wherein said wireless interface comprises a cellular wireless interface.

12. The connector of claim 11, wherein said cellular wireless interface comprises a cellular wireless interface compliant with the UMTS (Universal Mobile Telecommunications System) standard.

13. The connector of claim 11, wherein said host device comprises a cellular-enabled mobile device.

14. The connector of claim 9, wherein said wireless interface comprises a personal area network (PAN) enabled device.

15. The connector of claim 9, wherein said wireless interface comprises a Bluetooth enabled device.

16. The connector of claim 15, wherein said host device comprises a consumer premises equipment (CPE) configured for use within a satellite distribution network.

17. The connector of claim 9, wherein said wireless interface comprises a Wi-Fi interface compliant with at least one variant of IEEE Std. 802.11.

18. The connector of claim 17, wherein said Wi-Fi interface compliant with at least one variant of IEEE Std. 802.11 is configured to act as a Wi-Fi AP (Access Point).

19. A connector comprising:
a body;
at least one terminal adapted for mating to a corresponding terminal on a plug receivable at least partly within said connector; and
a wireless interface contained substantially within said body of said connector, said wireless interface being adapted to pass signals between said at least one terminal and at least one other device, said wireless interface further comprising a user-customized and extended digital processor, said user extension comprising at least one extension instruction included within the instruction set architecture of said processor and adapted to perform processing of data specifically required by a wireless protocol of said wireless interface, said processing comprising at least two independent and parallel steps of systematic convolutional coding, each of said coding steps taking account of all of said source data elements and providing parallel outputs of distinct series of coded data elements;
wherein said connector is adapted for mounting on a substrate within a host device.

20. A connector having:
a body;
at least one terminal adapted for mating to a corresponding terminal on a plug receivable at least partly within said connector; and
a wireless interface contained substantially within said body of said connector, said wireless interface being adapted to pass signals between said at least one terminal and at least one other device;
wherein said connector is adapted for mounting on a substrate within a host device, and said at least one terminal is accessible via an exterior of said host device;
wherein said wireless interface further comprises a user-customized and extended digital processor, said user extension comprising at least one extension instruction included within the instruction set architecture of said processor and adapted to perform processing of data specifically required by a wireless protocol of said wireless interface; and
wherein said processing comprises at least two independent and parallel steps of systematic convolutional coding, each of said coding steps taking account of all of said source data elements and providing parallel outputs of distinct series of coded data elements.

21. A connector having:

at least one terminal adapted for mating to a corresponding terminal on a plug receivable at least partly within said connector; and wireless means contained at least partly within said connector, said wireless means for passing signals between said at least one terminal and at least one other device, said wireless means further comprising processor means adapted to perform processing of data specifically required by a wireless protocol of said wireless interface, said processing comprising at least two independent and parallel steps of systematic convolutional coding, each of said coding steps taking account of all of said source data elements and providing parallel outputs of distinct series of coded data elements; wherein said connector is adapted for mounting on a substrate within a host device.

22. The connector of claim 21, wherein said connector comprises an RJ45 connector.

23. The connector of claim 21, wherein said wireless means comprises a cellular wireless interface.

24. The connector of claim 23, wherein said cellular wireless interface comprises a cellular wireless interface compliant with the UMTS (Universal Mobile Telecommunications System) standard.

25. The connector of claim 23, wherein said host device comprises a cellular-enabled mobile device.

26. The connector of claim 21, wherein said wireless means comprises a personal area network (PAN) enabled device.

27. The connector of claim 21, wherein said wireless means comprises a Bluetooth enabled device.

28. The connector of claim 27, wherein said host device comprises a consumer premises equipment (CPE) configured for use within a satellite distribution network.

29. The connector of claim 21, wherein said wireless means comprises a Wi-Fi interface compliant with at least one variant of IEEE Std. 802.11.

30. The connector of claim 29, wherein said Wi-Fi interface compliant with at least one variant of IEEE Std. 802.11 is configured to act as a Wi-Fi AP (Access Point).

* * * * *

UNITED STATES PATENT AND TRADEMARK OFFICE
CERTIFICATE OF CORRECTION

| | | |
|---|---|---|
| PATENT NO. | : 7,881,675 B1 | Page 1 of 1 |
| APPLICATION NO. | : 11/328359 | |
| DATED | : February 1, 2011 | |
| INVENTOR(S) | : Robert F. Gazdzinski | |

It is certified that error appears in the above-identified patent and that said Letters Patent is hereby corrected as shown below:

Column 17, Claim 2, Lines 6-11

CURRENTLY READS

The connector method of claim 1, wherein said at least one other device is associated with the same host device and said second wireless interface comprises a wireless interface adapted to communicate with said wireless interface of said connector according to a common air interface and communications protocol.

SHOULD READ

--The method of claim 1, wherein said at least one other device is associated with the same host device and said second wireless interface comprises a wireless interface adapted to communicate with said wireless interface of said connector according to a common air interface and communications protocol.--

Signed and Sealed this
Twenty-sixth Day of April, 2011

David J. Kappos
*Director of the United States Patent and Trademark Office*